United States Patent

Arthur et al.

[11] Patent Number: 5,997,786
[45] Date of Patent: Dec. 7, 1999

[54] METHOD FOR BONDING RIGID SUBSTRATES

[75] Inventors: Steven Paul Arthur; Brian Dale Kruse; Wayne Eugene Reister; Vladimir Azaroff, all of Midland, Mich.

[73] Assignee: Dow Corning Corporation, Midland, Mich.

[21] Appl. No.: 09/053,057

[22] Filed: Apr. 1, 1998

Related U.S. Application Data

[63] Continuation of application No. 08/498,282, Oct. 2, 1995, abandoned.

[51] Int. Cl.[6] .......................... B29C 35/02; B29C 65/52
[52] U.S. Cl. ...................... 264/135; 264/236; 156/307.7; 156/307.3
[58] Field of Search ................... 264/129, 135, 264/259, 261, 236, 263, 266; 528/485, 15; 156/307.1, 295, 307.3, 307.5, 307.7

[56] References Cited

U.S. PATENT DOCUMENTS

| | | | |
|---|---|---|---|
| 3,844,030 | 10/1974 | Wilkinson | 264/135 |
| 4,327,369 | 4/1982 | Kaplan . | |
| 4,386,042 | 5/1983 | Tatebayash . | |
| 4,555,294 | 11/1985 | Adams et al. | 264/259 |
| 4,719,065 | 1/1988 | Gibbon | 264/135 |
| 4,785,523 | 11/1988 | Koseki et al. | 264/259 |
| 4,810,590 | 3/1989 | Rich | 428/626 |
| 4,860,425 | 8/1989 | Kunisaki et al. | 264/259 |
| 4,916,016 | 4/1990 | Bristowe et al. | 264/259 |
| 4,957,677 | 9/1990 | Katoh et al. | 264/135 |
| 5,002,548 | 3/1991 | Campbell et al. | 606/116 |
| 5,002,625 | 3/1991 | Naritomi et al. | 264/259 |
| 5,160,780 | 11/1992 | Ono et al. | 428/220 |
| 5,207,961 | 5/1993 | Wank et al. | 264/135 |
| 5,213,739 | 5/1993 | Dickerson et al. | 264/135 |
| 5,254,302 | 10/1993 | Yamanaka | 264/129 |
| 5,364,921 | 11/1994 | Gray et al. . | |

FOREIGN PATENT DOCUMENTS

| | | |
|---|---|---|
| WO 95/21734 | 8/1995 | Germany . |
| WO 96/20252 | 7/1996 | Germany . |
| 54032565 | 3/1979 | Japan . |
| 54102355 | 8/1979 | Japan . |
| 56142045 | 11/1981 | Japan . |
| 62253418 | 11/1987 | Japan . |
| 88111267 | 5/1988 | Japan . |
| 63270107 | 11/1988 | Japan . |
| 89016657 | 3/1989 | Japan . |
| 5269919 | 10/1993 | Japan . |
| 8501897 | 2/1987 | Netherlands . |
| WO 95/21734 | 2/1994 | WIPO . |

*Primary Examiner*—Angela Ortiz
*Attorney, Agent, or Firm*—Catherine U. Brown

[57] ABSTRACT

Rigid substrates containing an adhesive composition on at least one surface are prepared by an injection molding operation. The degree of bonding between the adhesive layer and the substrate is greater than can be achieved using conventional methods for coating substrates with adhesive compositions.

6 Claims, 2 Drawing Sheets

METHOD FOR BONDING RIGID SUBSTRATES

This application is a continuation of application Ser. No. 08/498,282 filed on Oct. 2, 1995, which application is now abandoned.

BACKGROUND OF THE INVENTION

1. Field of the Invention

This invention relates to substrates containing a layer of adhesive on at least one surface. More particularly, this invention relates to rigid substrates wherein a layer of adhesive is cohesively bonded to at least one surface of the substrate during a molding operation. This invention also relates to a novel method for preparing these adhesive-coated substrates.

2. Background Information

The process of coating or encapsulating organic and inorganic substrates with molten materials while the substrates are confined in a mold cavity having the contour of the final coated article is described in the patent and journal literature. These materials are non-tacky in the solid state.

Preparing elastomer-coated metal copier rolls by placing the metal core in the central portion of a mold cavity, closing the mold, injecting a liquid curable composition to fill the volume between the perimeter of the core and the wall of the mold cavity and curing the composition to form the elastomer while the roll is enclosed within the mold cavity is described in Japanese Laid Open Application 54/102355. The additional step of pre-coating the metal roll with a primer is described in Japanese Examined Patent Application 89/16657.

Application and bonding of a preformed film to the surface(s) of an injection molded article during the molding operation is described in Netherlands Published Application No. 85/01897; Japanese Laid Open Application 62/253418; U.S. Pat. No. 4,386,042; and Japanese Laid Open Application 56/142045.

The molding of articles containing a metal insert by placing the insert containing a coating of isocyanate-based adhesive combined with a coupling agent in a mold cavity and then injecting into the mold cavity a reactive mixture comprising a polyisocyanate and a polyhydroxylated organic compound is described in Japanese Laid Open Application No. 63/270,107. Encapsulation of metal-containing substrates by a poly(arylene sulfide) is described in U.S. Pat. No. 4,810,590.

Encapsulation of electronic components composed at least in part of a metal by encapsulating the components with a flowable thermosetting resin composition during an injection molding process is described in U.S. Pat. No. 4,327,369.

Japanese Laid Open Application 05/269919 describes a process for coating a metal substrate with a layer of polyethylene that has been graft polymerized with a silane. The steps of the process comprise 1) cleaning the inner and/or outer surface(s) of the metal object by sand-blasting or pickling with HCl, $H_2SO_4$ or $HNO_3$, 2) degreasing the surface(s) using an alkali reagent and 3) coating the object with a molten material by extrusion, injection molding, calendaring or compression molding. A foamed polyurethane or foamed silane-grafted polyethylene layer can be used in place of grafted polyethylene layer.

Molding of a adhesively-bonded sealing material on to a sheet of window glass is described in Japanese Laid Open Application 54/32565.

A method for bonding a layer of silicone rubber to at least a portion of a molded article during a subsequent molding operation is described in Japanese Laid Open Patent Application No. 88/111267. The portion of the article to which the rubber is to be bonded is coated with a primer and the article is placed in a mold with a cavity corresponding to the contour of the coating to be applied. After the mold has been heated to the curing temperature of the silicone rubber composition, the composition is injected into the mold cavity. The coating is simultaneously molded and bonded to the surface of the article.

U.S. Pat. No. 5,002,548, which issued on Jun. 18, 1991, describes a method for coating at least a portion of a marker for identification of animals. The marker is at least partially inserted into a mold with a cavity corresponding in contour to the coated marker. A curable resin is injected into the cavity as the coating material and cured.

Methods taught in the prior art for bonding two substrates along a common interface typically comprise the steps of applying a layer of an adhesive in the form of a liquid or a film to at least one of the surfaces to be bonded, bringing these surfaces into contact with one another and maintaining the surfaces in close contact, preferably under pressure, during solidification and/or curing of the adhesive. The adhesive can be applied by spraying, dipping or placing a preformed layer of the adhesive on one of the surfaces to be bonded.

U.S. Pat. No. 5,160,780 describes a method for bonding a base for an automotive rear view mirror to a glass plate. In accordance with this method, a film of an adhesive composition containing a curable organic polymer or a curable polyorganosiloxane is applied to a glass plate or to one surface of a mirror mounting base formed from a metal or an organic polymer. A laminate consisting of the glass and the mounting base separated by the adhesive layer is formed and the laminate is heated to cure the adhesive.

A shortcoming of laminates prepared by applying a pre-formed adhesive to one of the substrates to be bonded is the absence of strong cohesive bonding between the adhesive and the substrate to which the adhesive is initially applied.

An objective of this invention is to improve the bonding between a substrate and a layer of adhesive that is applied to at least one surface of the substrate.

SUMMARY OF THE INVENTION

The objectives of the present invention are achieved by molding a layer of adhesive on to at least one surface of a rigid substrate. The surface(s) of the substrate to be coated forms at least one surface of the mold cavity into which the adhesive is injected. The contour of the mold cavity corresponds to the contour of the adhesive layer.

Figure 1:
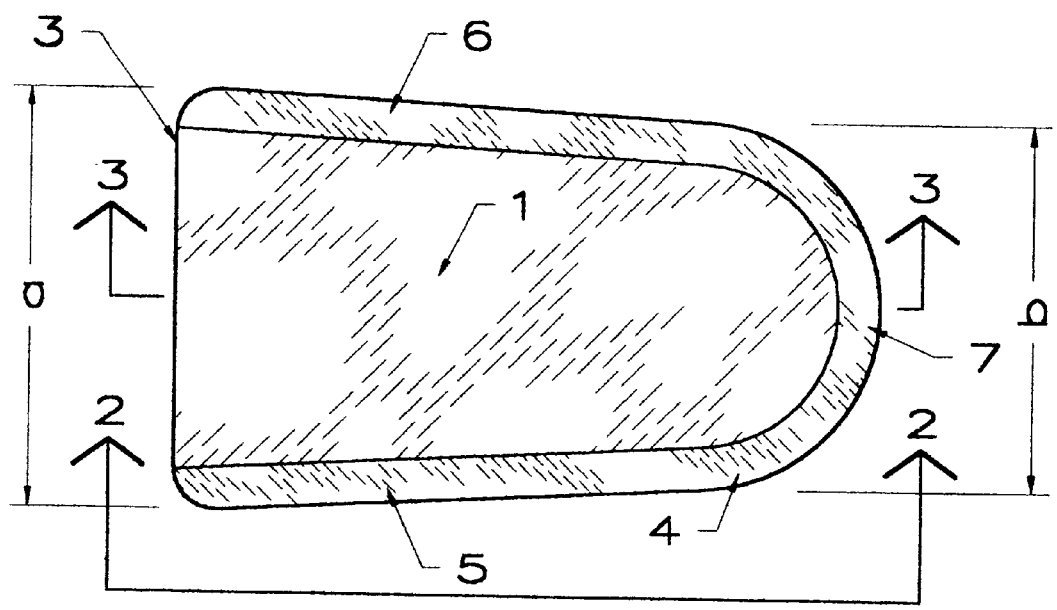
FIG. 1 is a top view of a preferred substrate for coating with an adhesive layer in accordance with the present method. This substrate is described in the example of the present specification.

The substrate depicted in the drawings is a block comprising an upper surface 1 and a lower surface 2. These surfaces are connected by a minor planar side 3 and a major side 4 consisting of two planar sections 5 and 6 joined by a curved section 7. Surfaces 1 and 2 are planar and substantially parallel. The block is formed from a rigid material such as a metal or an organic polymer with optional reinforcing agents to provide the desired rigidity.

In accordance with a preferred embodiment of the present invention wherein the block is used as the mounting plate for an automotive rear view mirror, the curved section of side 4 exhibits a radius of curvature of from about 0.2 to about 1 inch (0.5 to 2.5 cm).

Figure 2:
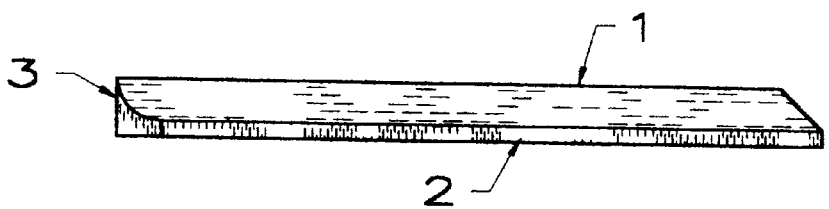
FIG. 2 is a side view of the substrate of FIG. 1 along line 2—2.
Figure 3:
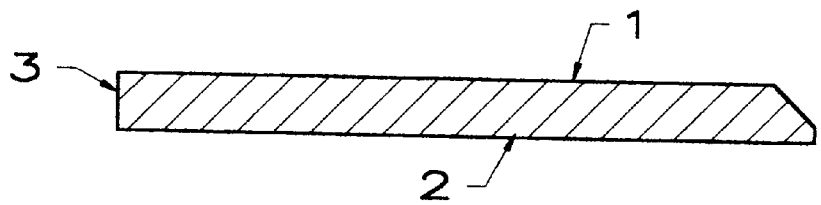
FIG. 3 is a sectional view of the substrate of FIG. 1 along line 3—3.
Figure 4:
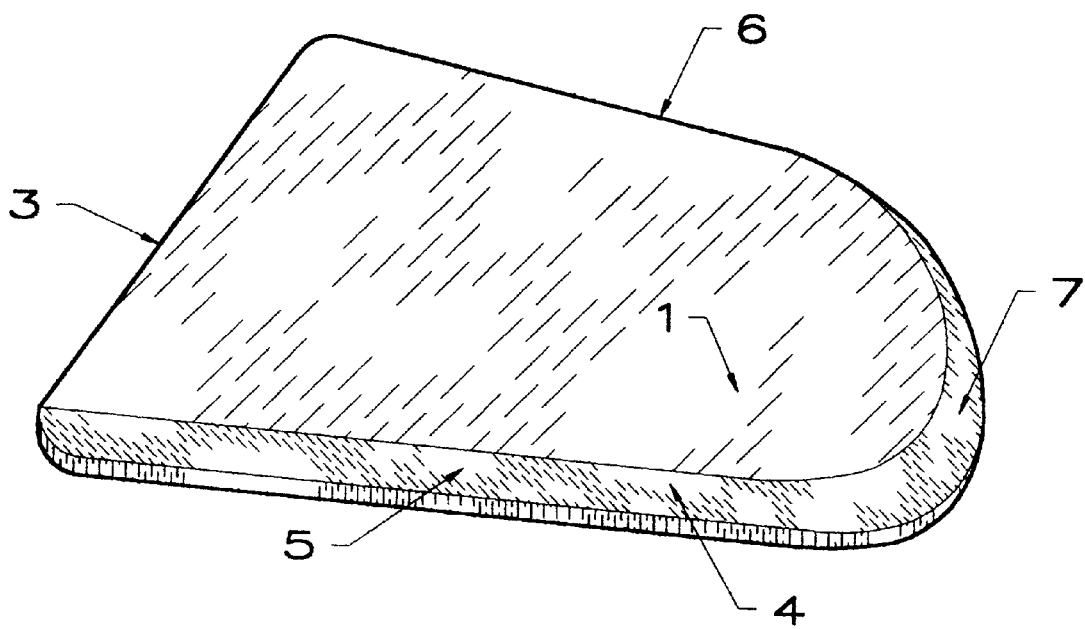
FIG. 4 is a perspective view of the substrate of FIG. 1.

The dimensions and contours of the upper and lower surfaces and the sides of the block depicted in FIGS. 1–4 are not critical with respect to the present method, and will be determined by the end-use application of the adhesively coated substrate prepared using this method.

The length and width of upper surface 1 can be from 0.5 to 39 inches (1.8 cm to 1 meter) or more, and the block can be from 0.1 to about 10 inch (0.25 to 25 cm) or more in thickness.

The orientation of sections 5 and 6 of side 4 with respect to one another is not critical with respect the ability of at least one surface of the block to be coated in accordance with the present invention. Sections 5 and 6 can be substantially parallel with respect to one another, or, as shown in the accompanying drawings, the sections can converge slightly toward one another with the result that dimension a is greater than dimension b by 0.1 mm or more.

In the preferred embodiment depicted in the accompanying drawings sides 3 and 4 are beveled at an angle of from 10 to about 45 degrees, with the result that the dimensions of side 1 are somewhat smaller than the corresponding dimensions of side 2.

DETAILED DESCRIPTION OF THE INVENTION

This invention provides a method for bonding a layer of an adhesive composition to the upper surface of a rigid substrate having upper and lower surfaces, said method comprising 1) forming an enclosed mold cavity from an open cavity mold and said rigid substrate wherein said upper surface mates with said open cavity mold;
2) injecting an adhesive composition which is non-flowing under ambient conditions into said mold cavity under a pressure and at a temperature sufficient to cause said composition to flow and completely fill said enclosed mold cavity and bond to said upper surface;
3) converting the resultant layer of said composition to a non-flowable material; and
4) separating the substrate coated with said composition from said open cavity mold.

The adhesive compositions used in accordance with the present method contain at least one film-forming ingredient that is typically an organic polymer or a polyorganosiloxane. The polymer is preferably curable by a crosslinking reaction and the composition contains a crosslinking agent for the polymer.

The characterizing feature of the present invention is the molding process used to apply the adhesive composition to the substrate. This process results in a substantial improvement in bond strength relative to prior art methods for applying adhesives to substrates as molten materials, as solutions or as preformed films.

Molding the adhesive on the substrate also improves bonding between the adhesive and a second substrate to which the adhesive-coated surface of the substrate is subsequently applied to form an integrally bonded laminate.

In a preferred embodiment of the present invention the substrate to which the adhesive layer is applied during the molding operation is a metal or ceramic mounting base for the rear view mirror of an automotive vehicle and the adhesive layer is used to bond the base to the glass windshield of the vehicle.

The Rigid Substrate

Substantially no restrictions apply to the type of material used to form the rigid substrate on to which a layer of adhesive composition is molded.

Preferred substrates for coating with the curable adhesive composition are metals, most preferably steel or aluminum, engineering plastics such as polyesters, polycarbonates and polysulfones, and other types of organic polymers. The polymers preferably contain glass fibers or other reinforcing agents to render them substantially non-deformable under the pressures and at the temperatures required to cause the adhesive composition to flow during the molding operation.

The dimensions of the rigid substrate are likewise not critical with respect to the present method used to apply a curable adhesive composition. For a practical molding operation it is desirable that the surface to be coated measure less than one meter in any dimension.

The surface on to which the adhesive is molded is preferably planar.

A preferred substrate is depicted in the accompanying drawings.

The Adhesive Composition

The adhesive compositions that are molded to form the present adhesive-coated substrates contain at least one film-forming ingredient that can be any of the known organic or organosilicon polymers exhibiting adhesive properties. If the adhesive properties of the polymer(s) are insufficient to provide the desired bond strength the compositions can contain one or more of the known tackifying resins and/or adhesion promoters to improve the bonding strength of the composition.

Polymers disclosed in the prior art as film type adhesives include but are not limited to natural and synthetic organic elastomers and curable organosiloxane compositions containing known adhesion-promoting ingredients The requirements of adhesive compositions used in the present method are 1) the ability of the composition to flow sufficiently to form a coherent coating on the non-deformable substrate during a molding operation; 2) the ability of the composition to cohesively bond to the surface that the composition is in contact with during the molding operation and any substrate which the adhesive layer is placed in contact with prior to curing of the composition; and 3) that the adhesive composition not exhibit measurable flow, as measured during a 24 hour period under ambient temperature and pressure, typically 25° C. and a pressure of one atmosphere (760 mm of mercury). Curable adhesive compositions are preferably non-flowing under ambient temperature and pressure prior to being cured.

The temperature during the molding operation must be below the decomposition temperature of all ingredients in the adhesive composition. If the composition is curable, the temperature must be also be below the initiation temperature of the curing reaction.

Preferred adhesive compositions are solid under ambient conditions and flow without curing at temperatures from 25 to 100° C. under pressures of from about 100 to 2000 pounds per square inch (0.69 to 345 Mpa.). As used in the present specification, the term "solid" refers to materials exhibiting a dry, tacky surface.

Preferred adhesive compositions of this invention are curable and comprise a curable organic polymer or polyorganosiloxane together with any additional curing agents and/or curing catalysts.

Organic polymers that exhibit sufficient adhesion, either alone or in combination with tackifying resins, such as esters of rosin acids, to qualify them for use as the film-forming ingredient of the present moldable adhesive compositions include but are not limited to thermoplastic polyolefins such as polyethylene and polypropylene; polyesters, including polycarbonates, that are prepared using condensation or free radical reactions; polyamides; polyurethanes; polysulfones; plasticized polymers of vinyl esters and vinyl acetals such as polyvinyl acetate and polyvinyl butyral; epoxide polymers; phenolics; nitrile elastomers; polyimides; and copolymers of ethylene and ethylenically unsaturated carboxylic acids such as acrylic acid.

Polyorganosiloxanes that cure to form elastomeric materials are preferred for use as the polymer ingredient(s) of the adhesive composition based on their processability and bonding properties. The adhesive properties of compositions containing heat curable film-forming organosiloxane polymers, such as polydiorganosiloxanes, can be improved by the presence of coupling agents; adhesion promoters; and/or organosiloxane resins containing $R_3SiO_{1/2}$ and $SiO_{4/2}$ units where R represents a monovalent hydrocarbon radical, most preferably an alkyl radical containing from 1 to 4 carbon atoms. Combinations of these organosiloxane resins with elastomeric polyorganosiloxanes constitute a known class of pressure sensitive adhesives.

A preferred class of compounds suitable for use as adhesion promoters and/or primers to increase the adhesion exhibited by both organic and organosiloxane polymer compositions are silanes and organosiloxanes containing at least one hydrolyzable group and one organofunctional group bonded to silicon atoms. The hydrolyzable group is preferably methoxy or ethoxy, and the organofunctional group is preferably alkenyl, epoxy, amino or (meth)acryloxyalkyl. Preferred alkenyl radical contain from 2 to 5 carbon atoms. The choice of organofunctional group will typically depend upon the type of substrate, i.e. organic or inorganic, and the polymer(s) present in the adhesive composition.

To improve their bond strength and moisture resistance the polyorganosiloxanes are preferably crosslinkable. Because the adhesive compositions are typically one part,i.e. all of the ingredients of the composition are packaged in a single container, when long term storage stability is desirable, the reaction used to crosslink the polymer should be one that requires heating to achieve curing at a useful rate.

Preferred curing reactions for the present adhesive compositions include but are not limited to hydrosilation (the reaction between silicon-bonded hydrogen atoms present on a curing agent and alkenyl radicals present on a polyorganosiloxane), and free radical reactions initiated by the decomposition of organic peroxides with decomposition temperatures above about 50° C.

In addition to at least one curable polyorganosiloxane and the optional adhesion promoter the curable organosiloxane compositions preferably contain a reinforcing agent, a crosslinking agent and, optionally, a catalyst for the curing reaction. Finely divided forms of silica are preferred reinforcing agents. The silica can be of the fumed or precipitated type. A preferred type of reinforcing silica is prepared from an alkyl orthosilicate and is treated with organosilicon compounds containing silanol or hydrolyzable groups to prevent a phenomenon referred to as "creping". The method for preparing this type of silica is described in U.S. Pat. No. 4,344,800, which issued to Michael Lutz on Aug. 17, 1982, Preparation of the Adhesive-Coated Substrate In accordance with the present method the adhesive composition is applied to at least one surface of the substrate during an injection molding operation. The surface(s) of the substrate to be coated defines a portion of the mold cavity.

Methods and equipment for injection molding compositions that are solids under ambient conditions and will flow when subjected to pressure with optional heating are sufficiently described in the literature that a detailed description in this specification will serve no useful purpose. A complete discussion of this subject is contained in the Encyclopedia of Polymer Science and Engineering edited by Herman Mark et al. and published by John Wiley and Sons.

In accordance with the present method for coating rigid substrates with adhesive compositions, the surface to be coated serves as one portion of an enclosed mold cavity.

During the first step of the molding process the perimeter of an open cavity mold that serves as the remaining portion of the enclosed mold cavity is placed on or around the surface to be coated. The adhesive composition is retained within this enclosed cavity during the subsequent molding operation. The contours of the surfaces that constitute the open mold cavity are preferably planar. The second step of the molding operation comprises injecting the adhesive composition into the enclosed mold cavity under sufficient pressure and with heating as required to convert the composition to a flowable material. The amount of composition is sufficient to completely fill the enclosed mold cavity.

The pressure used to inject the composition will depend at least in part on the viscosity of the composition at the temperature of the molding operation. This pressure can range from 100 to 2000 PSI (0.7 to 14 Mpa) or higher, and is preferably from 1200 to 1700 PSI (8.3 to 11.7 MPa.). When heating is required, the temperature of the composition is typically from 30 to 150° C.

The third step of the present method involves converting the adhesive composition to a non-flowable material. If the composition has been heated during the molding step, the layer of composition should be allowed to cool to the extent that it solidifies.

The fourth step of the present method involves separating the coated substrate with its bonded layer of adhesive from the open cavity mold that formed the remaining portion of the enclosed cavity during the molding step. This step of the process can be facilitated by coating the surfaces of the open cavity mold prior to the molding step of the present method with a material that will not adhere to the adhesive composition and will not transfer to the surface of the adhesive layer during the molding operation. Suitable releasing materials include but are not limited to solid fluorinated polymers such as polytetrafluoroethylene, polyvinylidene fluoride and fluorosilicone polymers.

Separation of the adhesive-coated substrate from the remainder of the mold cavity can be further facilitated by exerting a positive pressure against the coated surface of the substrate. The pressure can be exerted by mechanical means such as a piston or ram, or by a pressurized gas such as air or nitrogen.

Achieving adequate bonding between the adhesive composition and the substrate may require applying a primer or coupling agent to the surface to be coated prior to the molding operation and/or the presence of an adhesion promoter in the adhesive composition.

Compounds suitable for use as primers and adhesion promoters are discussed in a preceding section of this specification.

If the adhesive composition is crosslinkable, the process conditions during the injection and molding steps are controlled to avoid significant crosslinking of the film-forming polymer(s) present in this composition The adhesive composition is crosslinked after the surface of the substrate containing the molded adhesive layer is placed in contact with a second substrate to form the laminates that represent a preferred end use application for products of the present invention. These laminates consist of two substrates that are bonded to one another by a layer of one of the present adhesive compositions.

The following example describes a preferred substrate, adhesive composition and molding conditions, and should not be interpreted as limiting the scope of the present invention as defined in the accompanying claims. Unless otherwise specified all parts and percentages in the examples are by weight and the reported viscosity values were measured at 25° C.

EXAMPLE

The substrate was a substantially rectangular block formed by sintering finely divided steel particles to form the unitary structure shown in FIGS. 1–4 of the accompanying drawings The block was 0.17 inch (0.43 cm) thick and consisted of an upper surface 1 and lower surface 2 connected by a planar side 3 and side 4 consisting of two planar sections 5 and 6 and a curved section 7. Side 3 was 1 inch (2.5 cm) in length, the two planar sections of side 4 were 0.75 inch in length, and the radius of curvature of the curved section 7 was 0.43 inch (1.1 cm.). Lower surface 2 measured 1.2 inches (3.0 cm) in length. The planar sections 5 and 6 of side 4 angled slightly toward one another in the direction of curved section 7, with the result that dimension a was 0.99 inch (2.5 cm) and dimension b was 0.90 inch (2.2 cm).

Sections 5, 6 and 7 of side 4 were beveled at an angle of 29 degrees. As a result of this beveling, the maximum length of upper surface 1 was 1.17 inch (3 cm) and the maximum width of this surface was 0.855 inch (2.172 cm.).

Upper surface 1 was coated with a primer composition by spraying. The primer composition contained 4 percent by weight of allyltrimethoxysilane, 1 percent by weight of tetrabutyl titanate and 95 percent by weight of heptane.

When the primer composition had dried the block was placed on a horizontal surface with the coated upper surface (1) facing upward. The open mold cavity used to form a portion of the enclosed mold cavity into which the adhesive composition was subsequently injected had a perimeter corresponding in contour to the perimeter the upper surface (1) of the block but with the maximum length and width 0.02 inch shorter than the corresponding dimensions of the upper surface and a depth of 0.03 inch (0.76 mm). The sides of the open mold cavity originated from a planar surface that contained a passage for injection of material into the mold cavity, and were substantially perpendicular with respect to this surface. The interior surfaces of the open mold cavity were coated with a layer of polytetrafluoroethylene as a release agent.

The perimeter of the open mold cavity was placed on the coated surface of the block such that the longitudinal axes of the block and the open mold cavity were collinear. Sufficient pressure was exerted against the exposed lower surface (2) of the block to form a seal between the surface of the block and the perimeter of the open mold cavity, thereby retaining all of the adhesive composition within the cavity during the subsequent injection molding operation. This pressure was maintained during injection of the adhesive composition.

The curable organosiloxane adhesive composition was prepared by blending the following ingredients to homogeneity:

72 parts of a finely divided silica containing dimethylsiloxy, methylvinysiloxy and methylsiloxane groups on the surface of the particles, which were prepared from an alkyl silicate and the appropriate organosilicon compounds as treating agents using the method described in U.S. Pat. No. 4,344,800, issued to Michael Lutz on Aug. 17, 1982, which is hereby incorporated in its entirety by reference thereto;

12 parts of a dimethylvinylsiloxy-terminated polydimethylsiloxane gum containing 0.142 mole percent of methylvinylsiloxane units and exhibiting a plasticity of about 150 mm;

12 parts of a gum type dimethylvinylsiloxy-terminated dimethylsiloxane/methylvinylsiloxane copolymer containing 0.5 mole percent of methylvinylsiloxane units and exhibiting a plasticity of about 159 mm;

0.26 part of the monoallyl ether of glycerin;

0.03 part of methyl [tris (1,1-dimethyl-2-propynyloxy] silane;

0.14 part of a reaction product of hexachloroplatinic acid and sym-tetramethyldivinyldisiloxane that has been diluted with a liquid dimethylvinylsiloxy terminated polydimethylsiloxane in an amount sufficient to achieve a platinum content of 0.7 weight percent;

0.5 part of 3-methacryloxypropyltrimethoxysilane;

0.5 part of 3-glycidoxypropyltrimethoxysilane; and 1.9 parts of a liquid trimethylsiloxy-terminated polymethylhydrogensiloxane with a silicon-bonded hydrogen content of about 1.6 weight percent.

A quantity of this curable composition sufficient to completely fill the enclosed mold cavity was pumped into the cavity under a pressure of 1600 PSIG (11 Mpa). A jet of air under a pressure of 75 PSIG (0.5 Mpa) was then admitted to the cavity to separate the coated block from remaining portion of the enclosed mold cavity.

A second open mold cavity with the same dimensions as the one used to apply the coating was placed on the coated surface of the block in the same manner as the first cavity and sufficient pressure was applied against the layer of adhesive to flatten the sprue remaining from the molding operation into the body of the adhesive composition. A stream of air under a pressure of 75 PSIG (0.5 Mpa) was then directed into the enclosed mold cavity to eject the coated block.

After the blocks were stored for 24 hours, test samples were prepared by pressing the coated surface of a block against a sheet of plate glass using a force of about 100 pounds (45 kg.) The glass sheet containing the adhered block was then placed in an oven maintained at a temperature of 141° C. for one hour to cure the adhesive layer.

After cooling to ambient temperature one group of five samples (A) was tested for adhesion by securing a clamp around the beveled edge of the block, securing the glass sheet in position and exerting sufficient tensile force on the clamp to pull the block away from the glass plate. The force required to break this bond was recorded.

A second group of five samples (B) were placed in room temperature water for 24 hours before being tested.

For comparative purposes the same curable adhesive composition that had been molded onto the upper surface 1 of the blocks was prepared in the form of a calendared sheet measuring 0.03 inch (0.0076 cm) in thickness. Pieces corresponding in contour to the upper surface (1) of the block were cut from the sheet and applied to this surface together with an overlying release layer using manual pressure or a hand-held roller. The blocks used for the comparative example were the same ones described in the preceding section of this example and depicted in FIGS. 1 to 4 of the accompanying drawings.

After the layer of release material was removed, the adhesive-coated side of the block was then placed against a sheet of glass, the adhesive was cured and adhesion of the block to the glass was evaluated as described in the preceding section of this example.

The results of the adhesion test are recorded in the following table. The comparative samples tested prior to and following water immersion are referred to as C and D, respectively.

| Sample No. | Force in Pounds (Kg) |
|---|---|
| A | 451.4 (203.1) |
| B | 310.3 (139.6) |
| C | 411.0 (185.0) |
| D | 197.8 (89.0) |

The greater force required to separate blocks A and B prepared using the present method from the glass relative to comparative samples C and D demonstrate the improved bonding that can be achieved by molding the adhesive coating on to the substrate rather than applying a pre-cut sheet of adhesive to the block as taught in the prior art.

That which is claimed is:

1. A method for preparing substrates containing a molded adhesive layer comprising:
   1) forming an enclosed mold cavity from an open cavity mold and a first rigid substrate having an upper surface, wherein said first rigid substrate comprises a material selected from the group consisting of metals and organic polymers and wherein the upper surface mates with said open cavity mold, thereby forming said enclosed mold cavity;
   2) injecting an adhesive composition which is non-flowing under ambient conditions into said enclosed mold cavity under a pressure and at a temperature sufficient to cause said adhesive composition to flow and completely fill said enclosed mold cavity and bond to the upper surface, with the proviso that said adhesive composition comprises a material selected from the group consisting of organic polymers and polyorganosiloxanes, the pressure is in the range of 100 to 2,000 PSI, and the temperature is in the range of ambient to 200° C.;
   3) converting said adhesive composition to a non-flowable layer coated on the upper surface;
   4) separating said first rigid substrate from said open cavity mold;
   5) thereafter bonding said non-flowable layer with a surface of a second substrate at a temperature less than that temperature required to cure said adhesive composition, and
   6) thereafter curing said adhesive composition wherein the first rigid substrate is separated from said open cavity mold by exerting a positive pressure against the coated upper surface of said upper surface.

2. The method of claim 1, wherein said first rigid substrate comprises a metal, said open cavity mold comprises planar surfaces that contain a coating of a non-transferable release agent, and wherein the pressure is in the range of 1,200 to 1,700 PSI and the temperature is in the range of 30 to 150° C.

3. The method of claim 2, wherein said adhesive composition cures by a platinum catalyzed hydrosilation reaction and contains at least one adhesion-promoting additive, said adhesion-promoting additive comprises a silane or a liquid polyorganosiloxane containing at least one hydrolyzable group bonded to a silicone atom, and said release agent is a fluorocarbon polymer or a fluorosilicon polymer.

4. A method for bonding a non-flowable layer of an adhesive composition to a first rigid substrate having an upper surface, wherein the method comprises:
   1) coating said upper surface with a primer composition prior to application of said adhesive composition;
   2) forming an enclosed mold cavity from an open cavity mold and said rigid substrate, wherein the upper surface mates with said open cavity mold, thereby forming said enclosed mold cavity;
   3) injecting said adhesive composition which is non-flowing under ambient conditions into said enclosed mold cavity under a pressure and at a temperature sufficient to cause said adhesive composition to flow and completely fill said enclosed mold cavity and bond to said upper surface, with the provisos that the adhesive composition comprises a material selected from the group consisting of organic polymers and polyorganosiloxanes, the pressure is in the range of 100 to 2,000 PSI, and the temperature is in the range of ambient to 200° C.;
   4) converting said adhesive composition to a non-flowable layer coated on the upper surface of said first rigid substrate;
   5) separating said first rigid substrate with the non-flowable layer from said open cavity mold;
   6) thereafter bonding the non-flowable layer with a surface of a second substrate at a temperature less than that temperature required to cure said adhesive composition; and
   7) thereafter curing said adhesive composition wherein the first rigid substrate is separated from said open cavity mold by exerting a positive pressure against the coated upper surface of said upper surface.

5. The method of claim 4, wherein said first rigid substrate comprises a metal, said open cavity mold comprises planar surfaces that contain a coating of a non-transferable release agent, the pressure is in the range of 1,200 to 1,700 PSI and the temperature is in the range of 30 to 150° C.

6. The method of claim 5, wherein said adhesive composition is a one-part, heat-curing organosiloxane composition that cures by a platinum catalyzed hydrosilation reaction and contains at least one adhesion-promoting additive, said adhesion-promoting additive and said primer composition comprise a silane or a liquid polyorganosiloxane containing at least one hydrolyzable group bonded to a silicon atom, and said release agent is a fluorocarbon polymer or a fluorosilicone polymer.

* * * * *